Sept. 26, 1939. J. G VINCENT Re. 21,221
TRANSMISSION MECHANISM
Original Filed July 8, 1930
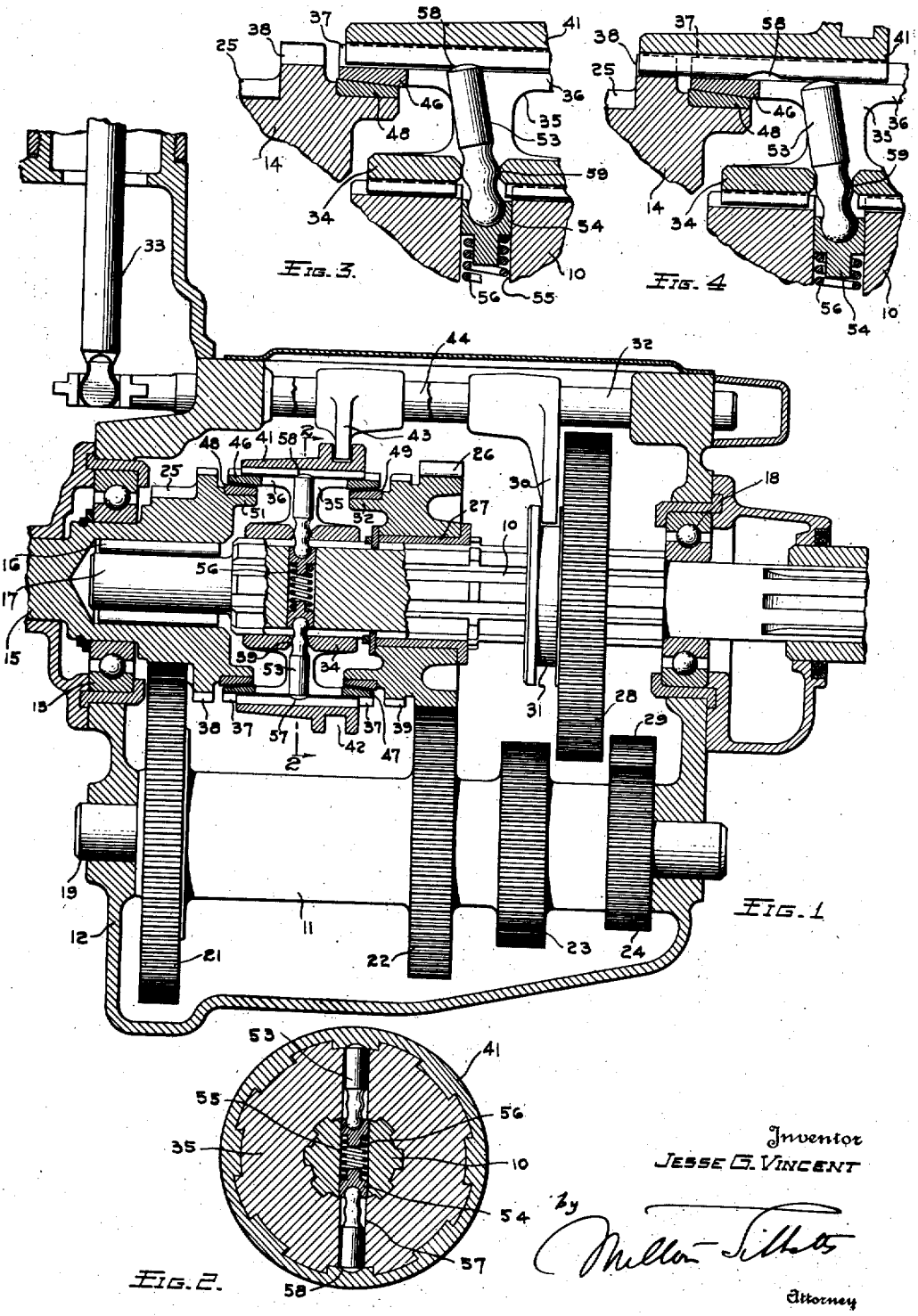
Inventor
JESSE G. VINCENT
By Milton Sibbets
Attorney Reissued Sept. 26, 1939

Re. 21,221

UNITED STATES PATENT OFFICE 21,221

TRANSMISSION MECHANISM

Jesse G. Vincent, Detroit, Mich., assignor to Packard Motor Car Company, Detroit, Mich., a corporation of Michigan Original No. 1,901,713, dated March 14, 1933, Serial No. 466,418, July 8, 1930. Application for reissue October 30, 1934, Serial No. 750,712

24 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it has been previously proposed to synchronize the toothed clutch elements to be meshed by various means, such as friction clutches. Such devices, however, have been open to certain objections. The mechanisms employed have been in general cumbersome and complicated. Frequently the friction elements have not been applied with sufficient pressure to effect proper synchronization within the very short time interval available for this purpose, or if so applied, the operating mechanism has been subjected to excessive wear. This has made it necessary to release the synchronizing means immediately upon engagement of the toothed clutch elements, which in turn requires delicate and complicated means to determine the exact time of application and of release.

One of the objects of this invention is to provide a motor vehicle transmission having an improved device for synchronizing the toothed clutch elements in the gear train, which shall be simple and effective, and in which it is unnecessary to release the device after meshing of the toothed clutch elements is effected.

Another object of the invention is to provide a motor vehicle transmission with a device of the character designated in which the operation of the synchronizing clutches shall be effected through rotating parts not subjected to high relative speeds, and in which accurate timing of the application and release shall be unnecessary.

Another object of the invention is to provide a transmission synchronizing device in which the engagement pressure of friction elements shall be considerably augmented to bring the toothed clutch elements quickly to synchronous speed, and in which the friction elements shall remain in engagement while the toothed clutch elements are in mesh.

Other objects of the invention will appear from the following description taken in connection with the drawing, which forms a part of this specification, and in which:

Fig. 1 is a view, partially in side elevation and partially in vertical section through a motor vehicle transmission constructed in accordance with the invention;

Fig. 2 is a view in section taken substantially on the line 2—2 of Fig. 1; and

Figs. 3 and 4 are enlarged fragmentary sectional views of part of the transmission shown in Fig. 1, illustrating successive positions of the device during a characteristic gear ratio changing operation.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a lever 33 of usual form which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This constitutes a splined hub portion 34, slidably mounted on the splines of the shaft 10 and rotatable therewith, a radial web portion 35, and an axially disposed rim portion 36 which is provided with external splines or teeth 37. These teeth 37 are adapted for connection either to clutch teeth 38, formed on the shaft end 14 adjacent the pinion 25, or to clutch teeth 39 formed on the body of gear 2 , these clutch teeth 37, 38 and 39 being of the same pitch. To this end a clutch ring 41 is slidably mounted on and surrounds the rim 36, and is provided with internal splines cooperating with the splines 37 which may engage the teeth 38 when the ring is moved forwardly of the transmission, and may engage the teeth 39 when moved rearwardly thereof. To effect such sliding movement, the clutch ring is provided with a shifter groove 42, actuated by a shifter fork 43, which is connected to a shifter rod 44 similar to the rod 32 and likewise selectively operated by the gear shift lever 33. It will be evident that when the clutch ring is in engagement with the teeth 39, the constant mesh gear 26 is locked to the shaft 10, providing the second speed, and that when the teeth 38 are engaged with the clutch ring the shafts 10 and 15 are directly coupled, giving the third speed which is direct drive.

To perform the clutching operation just described without shock or clash, this invention provides a synchronizing device adapted to bring the pairs of clutch teeth 37—38 or 37—39 to the same speed before positive engagement of the clutch ring 41. For this purpose, the oppositely disposed inner edges of the rim portion 36 are formed with conical clutch brake or friction surfaces 46 and 47, which may be detachable rings if desired. The surface 46 is adapted to contact a conical friction clutch ring 48 when the hub 34 is moved forwardly or toward the left in Fig. 1, and the surface 47 is adapted to contact a similar friction clutch ring 49 when the hub is moved rearwardly or toward the right. These rings may be of any suitable material, such as bronze, and are preferably formed as independent members, pressed or otherwise secured on axially disposed extensions 51 and 52 on the shaft end 14 and on the gear body 26 respectively.

The corresponding members 46—48 or 47—49 of each of these friction clutch devices are so spaced as to be engaged upon a relatively small axial movement of the hub 34 from its neutral position, and with considerable pressure, so that the relatively rotating members are synchronized by being frictionally connected before intermeshing contact of the positive clutch device.

In accordance with this invention, operation of the synchronizing or friction clutch device is effected by the movement toward clutching position of the ring 41, through suitable lever mechanism. As shown, this comprises a pair of floating levers 53, fulcrumed at their inner ends on the shaft 10 and adapted to communicate sliding motion of the clutch ring 41 to the hub 34 at a reduced amplitude but with increased pressure. At their inner ends the levers 53 are provided with rounded fulcrum portions seated in fulcrum blocks 54 which are slidably mounted in a transverse bore 55 through the shaft 10, and are yieldingly urged apart by a spring 56 disposed between them within the bore. The levers extend radially through slots 57 in the clutch device, these slots extending through the hub 34, the web 35 and the rim portion 36. The outer ends of the levers 53 are slightly rounded, so that each may engage in a shallow recess 58 formed in the top of one of the internal splines of the clutch ring 41. Intermediate its ends each of the levers 53 has a bearing between suitable abutments 59 on the hub member 34, the relation of these abutments to the ends of the lever being such, in the embodiment illustrated, as to make the mechanical advantage about four to one.

The operation of this device will be readily understood from the foregoing description. Assuming that it is desired to change the gearing in the vehicle transmission from second speed to high speed, and that the second speed gears have already been disconnected, the parts are in neutral position as shown in Fig. 1, the main engine clutch being disengaged, the clutch shaft 15 stopped or rotating slowly, while the shaft 10 is being driven from the vehicle at a somewhat greater speed. From this position the operator first moves the clutch ring 41, through the shifter rod 44 and lever 33, forwardly or toward the left in the direction of the clutch teeth 38. This also carries forward the outer ends of the levers 53, which are seated in the recesses 58, which thus exerts a powerful pressure on the abutments 59, tending to move the entire clutch device forwardly. Resulting movement of the hub 34 brings the friction faces 46 and 48 of the friction clutch device into contact with a high axial pressure, frictionally connecting the shafts 10 and 15, so that the shaft 15 is rapidly brought up to the speed of the shaft 10. At this stage of the operation the parts are in the position shown in Fig. 3.

Continued movement of the clutch ring 41 is resisted, through the levers, by the axial reaction to the pressure exerted upon the friction face 46. When the pressure on the ring 41 exceeds a predetermined amount, there is a cam movement of the notch or recess 58 on the rounded end of the lever, a component of which, applied through the lever 53, depresses said lever and its fulcrum 54 against the action of spring 56 into the position shown in Fig. 4. In this depressed position the outer end of each of the levers 53 rides out of its cooperating recess 58, permitting the ring 41 to continue its forward movement, the end of the lever sliding on one of the splines as shown. The splines then easily slide into intermeshing engagement with the teeth 38. The shafts 15 and 10 are now directly and positively coupled together, giving a direct drive for the vehicle.

This operation has been described in connection with a gear change from second to high gear but the change down from high to second gear is effected in a similar manner as will be readily understood, the clutch ring 41 in this case being moved rearwardly to first engage the friction faces 47 and 49, and then to connect the clutch teeth 37 and 39. In this case the levers 53 are inclined toward the rear.

It will also be evident that this invention may be applied to synchronization of the first speed and reverse gears if desired, and that it may be readily embodied in transmissions having four or more speed ratios as well as in the three speed transmission described.

The mechanical advantage provided by the operating levers assures a heavy application pressure of the friction clutch device, thus promptly bringing the rotating elements to synchronous speed with a minimum of slip. Moreover, it will be appreciated that this mechanism is completely carried by the rotating elements, so that high rubbing speeds under heavy pressures, such as occur when the actuating mechanism is mounted on the transmission housing or other stationary part, are avoided, and excessive wear is thereby obviated. As the synchronizing mechanism is completely carried by the rotating parts, there is no relative movement to consider, and accordingly there is no necessity for releasing the synchronizing clutch upon engagement of the positive clutch. In this way the use of all delicate and expensive timing mechanism is avoided.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

I claim:

1. In a motor vehicle transmission having driving and driven members, positive clutch means slidable to connect said members, a friction clutch between said members engageable in advance of the positive clutch means, and radially displaceable levers operable by movement of the positive clutch means to engage the friction clutch.

2. In a motor vehicle transmission having driving and driven members, concentric means including a friction clutch element and a positive clutch element slidably mounted on one of said members to successively engage the other member, and radially displaceable levers connecting said concentric means and said member to communicate sliding motion of the positive clutch element to the friction clutch element.

3. In a motor vehicle transmission having a driving member and a driven shaft, a hub member splined on said shaft, a friction clutch element carried by said hub to engage the driving member, a positive clutch member splined to said hub and slidably engageable with said driving member, and means including levers to transmit movement of the positive clutch member to the hub member with decreased amplitude and increased force.

4. In a motor vehicle transmission having a driving member and a driven shaft, a hub member splined on said shaft, a friction clutch member carried by said hub to engage the driving member, a positive clutch member splined to said hub and slidably engageable with said driving member, and means including levers yieldingly fulcrumed on the driven shaft and connecting said friction and positive clutch members to effect successive engagement thereof.

5. In a motor vehicle transmission having a driving member and a driven shaft, a hub member splined on said shaft, a friction clutch element carried by said hub to engage the driving member, a positive clutch member splined to said hub and slidably engageable with said driving member, and means including floating levers fulcrumed on the driven shaft and communicating sliding movement of the positive clutch member to the hub member in reduced amplitude to engage the friction clutch element before engagement of the positive clutch member.

6. In a motor vehicle transmission having a driving member and a driven shaft, a clutch hub splined on the shaft and slidable toward the driving member, positive clutch means slidably mounted on said hub, and a friction clutch element carried by said hub to engage the driving member, and movement reducing means fulcrumed on the driven shaft to communicate preliminary movement of the positive clutch means to the friction clutch element, said means being depressible upon a predetermined resistance to movement of the friction clutch element to automatically disconnect from the positive clutch means.

7. In a motor vehicle transmission having a driving member and a driven member, a friction clutch device axially movable to connect said members, a positive clutch device axially movable to connect said members, and means to actuate the friction clutch device from the positive clutch device including levers operatively associated with said clutch devices, and resiliently yieldable fulcrum members for said levers carried by the driven member to permit radial disengagement of the actuating means upon a predetermined axial pressure on the friction clutch device.

8. In a motor vehicle transmission having a driving member and a driven member, a friction clutch device axially movable to connect said members, a positive clutch device axially movable to connect said members, means to transmit axial movement of the positive clutch device to the friction clutch device at increased pressure including levers operated by the positive clutch device and engaging the friction clutch device, and spring supported fulcrum members for said levers carried by the driven member to permit disengagement of said levers and continued movement of the positive clutch device upon a predetermined pressure on the friction clutch device.

9. In a motor vehicle transmission having a driving and a driven member, a positive clutch device axially movable to connect said members, a friction clutch device adapted to connect said members in advance of said positive clutch device, and means rotatable with the driven member to actuate the friction clutch device from the positive clutch device at an increased pressure, said means comprising radially displaceable levers and spring mounted fulcrums therefor.

10. In a motor vehicle transmission having a driving and a driven member, a positive clutch device axially movable to connect said members, a friction clutch device adapted to connect said members in advance of said positive clutch device, and means including displaceable levers rotatable with and fulcrumed on the driven member connecting said clutch devices to actuate the friction clutch device from the positive clutch device up to a predetermined pressure on said friction clutch device.

11. In a motor vehicle transmission, a driving member, a driven member, positive clutch means to connect said members, friction clutch means associated with said members and engageable before the positive clutch means, and means including pivoted levers operated by initial engaging movement of the positive clutch means to engage the friction clutch, said levers being bodily movable thereafter to permit engagement of the positive clutch.

12. In a motor vehicle transmission, a driving member, a driven member, positive clutch means to connect said members, friction clutch means associated with said members and engageable ahead of the positive clutch means, and means including pivoted levers operated by initial engaging movement of the positive clutch means to engage the friction clutch, said levers being bodily movable thereafter to permit engagement of the positive clutch.

13. In a motor vehicle transmission mechanism, a driving member, a driven member, a positive clutch between the members, a friction clutch between the members, and connecting means intermediate said clutches including levers, said levers during the initial application movement of the clutches pivoting to form a positive connection between the clutches to apply the friction clutch in advance of the positive clutch and then moving bodily during the remainder of the application movement of the positive clutch to break the positive connection between the clutches to allow application of the positive clutch without increasing the application pressure on the friction clutch.

14. In a motor vehicle transmission, a driving member, a driven member, positive clutch means to connect said members, friction clutch means associated with said members and engageable in advance of the positive clutch means, and means including pivoted levers operated by initial engaging movement of the positive clutch means to transmit movement to the friction clutch means with decreased amplitude and increased force, said levers being bodily movable thereafter to permit engagement of the positive clutch.

15. In a motor vehicle transmission, a driving member, a driven member, positive clutch means to connect said members, friction clutch means engageable in advance of the positive clutch means, and spring mounted pivoted levers operated by initial movement of the positive clutch means to engage the friction clutch means, said levers being bodily movable thereafter.

16. In a motor vehicle transmission, a driving member, a driven member, positive clutch means to connect said members, friction clutch means engageable in advance of the positive clutch, and means including pivoted levers operated by initial movement of the positive clutch to engage the friction clutch, said levers being radially displaceable thereafter.

17. In a motor vehicle transmission, a driving member, a driven shaft, a hub member splined on said shaft, a friction clutch element carried by said hub to engage the driving member, a positive clutch member splined to said hub and slidably engageable with said driving member, and means including pivoted levers to transmit movement of the positive clutch member to the hub member with decreased amplitude and increased force.

18. In a motor vehicle transmission, a driving member, a driven member, a friction clutch device axially movable to connect said members, a positive clutch device axially movable to connect said members, means including pivoted levers to transmit axial movement of the positive clutch device to the friction clutch device at increased pressure, and spring supported fulcrum members for said levers.

19. In a motor vehicle transmission, a driving member, a driven member, positive clutch means to connect said members, friction clutch means between said members engageable in advance of the positive clutch means, and means including pivoted levers operated by initial movement of the positive clutch means to engage the friction clutch means and displaceable with respect to said members upon further movement of the positive clutch means.

20. A synchronizer comprising, in combination with a driving and a driven member, a clutch member mounted on one of said members having a friction clutch portion and a positive clutch portion, said positive clutch portion having radial teeth, a hub rotatively fixed on and axially movable on the other member having a friction clutch portion and radial positive clutch teeth in end to end relation with the radial clutch teeth of said first mentioned clutch portion, an axially movable rotatively fixed locking member surrounding said hub for bridging the teeth of the two clutch members to lock the two clutch members together, and means for resiliently locking said locking member and hub together axially.

21. A synchronizer comprising, in combination with a driving and a driven member, a clutch member mounted on one of said members having a friction clutch portion and radial positive clutch teeth, a hub rotatively fixed and axially movable on the other member having a friction clutch portion and radial positive clutch teeth in end to end relation with said first mentioned positive clutch teeth, an axially movable rotatively fixed locking member surrounding said hub for bridging said teeth to lock the hub and clutch member together, a cammed notch in said locking member and a spring pressed poppet in said hub member for resiliently connecting axially said hub and locking member.

22. A synchronizer comprising, in combination with a driving member and a driven shaft, a clutch member mounted on said driving member having a friction clutch portion and radial positive clutch teeth, a hub rotatively fixed and axially movable on said shaft and having a friction clutch portion and radial positive clutch teeth in end to end relation with said first mentioned clutch teeth, a locking ring surrounding said hub for bridging said clutch teeth to lock the hub and clutch member together and resilient means for axially locking said locking ring and hub together.

23. A synchronizer comprising, in combination with a driving member and a driven member, a clutch member mounted on one of said members having a friction clutch portion and radial positive clutch teeth, a hub rotatively fixed on the other member and axially movable thereon having a friction clutch portion and radial positive clutch teeth in end to end relation with said first mentioned positive clutch teeth, a locking ring surrounding said hub for bridging said clutch teeth to lock the hub and clutch member together, resilient means axially connecting said locking ring and hub, said locking ring having a peripheral groove, and a shifting fork engaging said gro e.

24. A synchronizer comprising, in combination with coaxial driving and driven shafts, and a gear rigid on the driving shaft and a gear rotatable on the driven shaft, a clutch member mounted on each of said gears, each of said clutch members having a friction cone portion and a positive clutch portion, said positive clutch portion having radial external teeth, a symmetrical hub surrounding and rotatively fixed on and axially movable on the driven shaft and having two like friction cone clutch portions complemental to the friction cone clutch portions on said clutch members, said hub also having circumferentially outwardly beyond the friction clutch portions thereon radial positive clutch teeth in end to end relation with the radial external teeth on both of said clutch members, an axially movable rotatively fixed locking member surrounding said hub and having internal teeth engaging the radial positive clutch teeth on the hub and adapted to selectively engage the positive clutch teeth on the clutch member of either of said gears to lock the hub and the selected gear together, a notch in said locking member and a spring pressed member mounted in the hub for resiliently connecting axially said hub and locking member.

JESSE G. VINCENT.